United States Patent [19]

Loup

[11] 4,444,216

[45] Apr. 24, 1984

[54] PRESSURE REDUCING AND REGULATING VALVE

[75] Inventor: Ronald L. Loup, Clarkson, Mich.

[73] Assignee: Koomey, Inc., Brookshire, Tex.

[21] Appl. No.: 339,554

[22] Filed: Jan. 15, 1982

[51] Int. Cl.³ .................. F16K 3/18; G05D 16/00
[52] U.S. Cl. ...................... 137/116; 137/625.35; 251/50; 251/249.5
[58] Field of Search .............. 137/625.33, 625.37, 137/625.38, 625.48, 116, 625.35; 251/327, 14, 50, 249.5, 134, 175, 282; 74/424.8; 418/181; 267/175, 177

[56] References Cited

U.S. PATENT DOCUMENTS

| | | | |
|---|---|---|---|
| 3,889,924 | 6/1975 | Karpenko | 251/249.5 |
| 3,917,220 | 11/1975 | Gilmore | 251/175 |
| 4,111,070 | 9/1978 | Stratienko | 267/177 |
| 4,239,178 | 12/1980 | Engel | 251/14 |
| 4,316,599 | 2/1982 | Bouvet | 251/50 |
| 4,333,391 | 6/1982 | Nash | 267/177 |

Primary Examiner—Martin P. Schwadron
Assistant Examiner—James R. Shay
Attorney, Agent, or Firm—Fulbright & Jaworski

[57] ABSTRACT

A pressure reducing and regulating valve having a container with a plurality of openings for moving between first and second flow plates having a plurality of inlet ports and a plurality of outlet ports for providing multiple flow paths through the valve for providing maximum flow with a short regulating stroke. The valve may be actuated by a combination of a manual screw adjustment and/or a powered operated overdrive which utilize drive gear to provide a failsafe operation as the power overdrive maintains the regulated pressure even if the pilot source fails. Valve means and stop means control the extent of travel of the adjustment screw. An integral pilot operated bypass valve may be utilized for remotely controlling the actuation of the valve.

19 Claims, 14 Drawing Figures

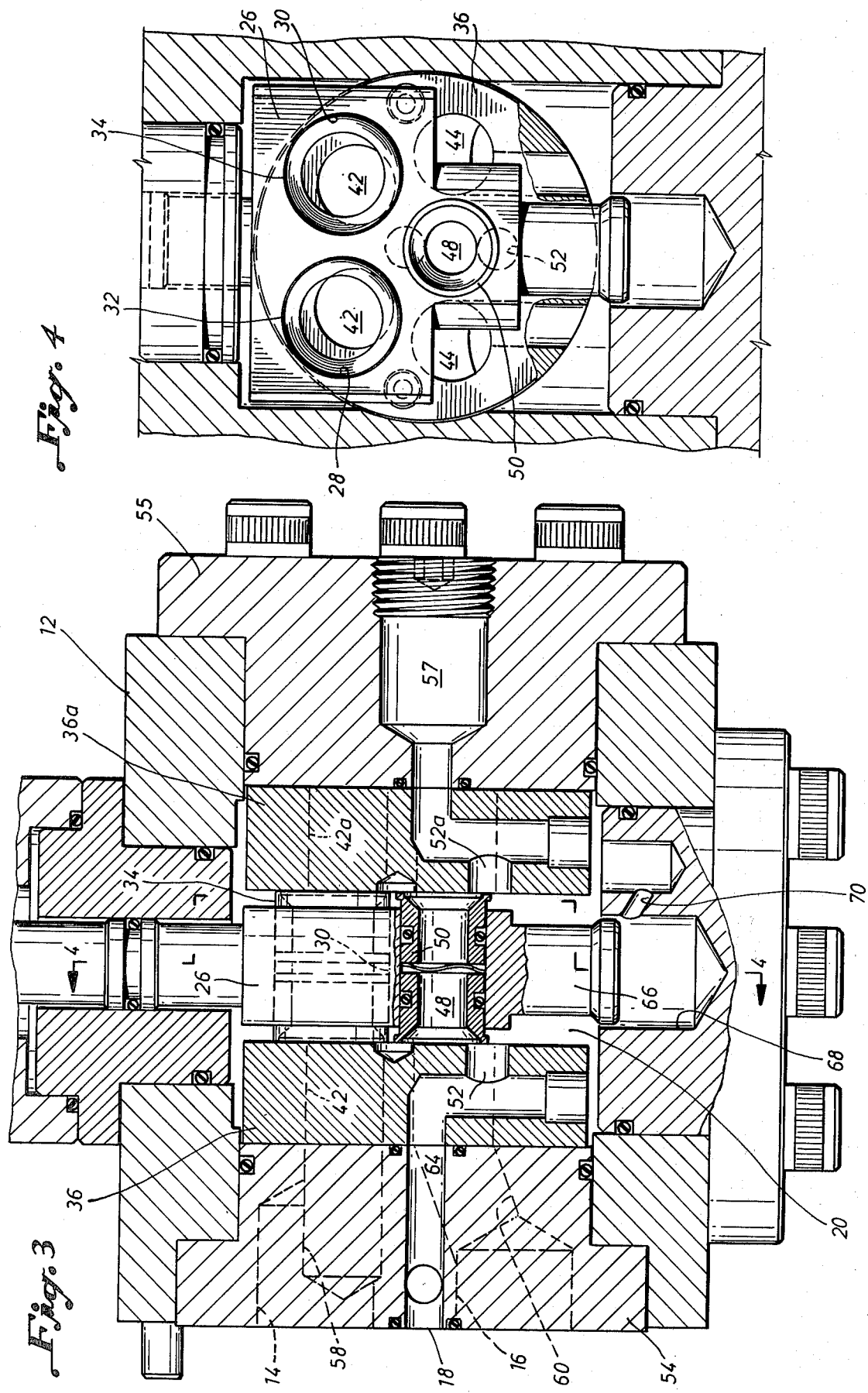

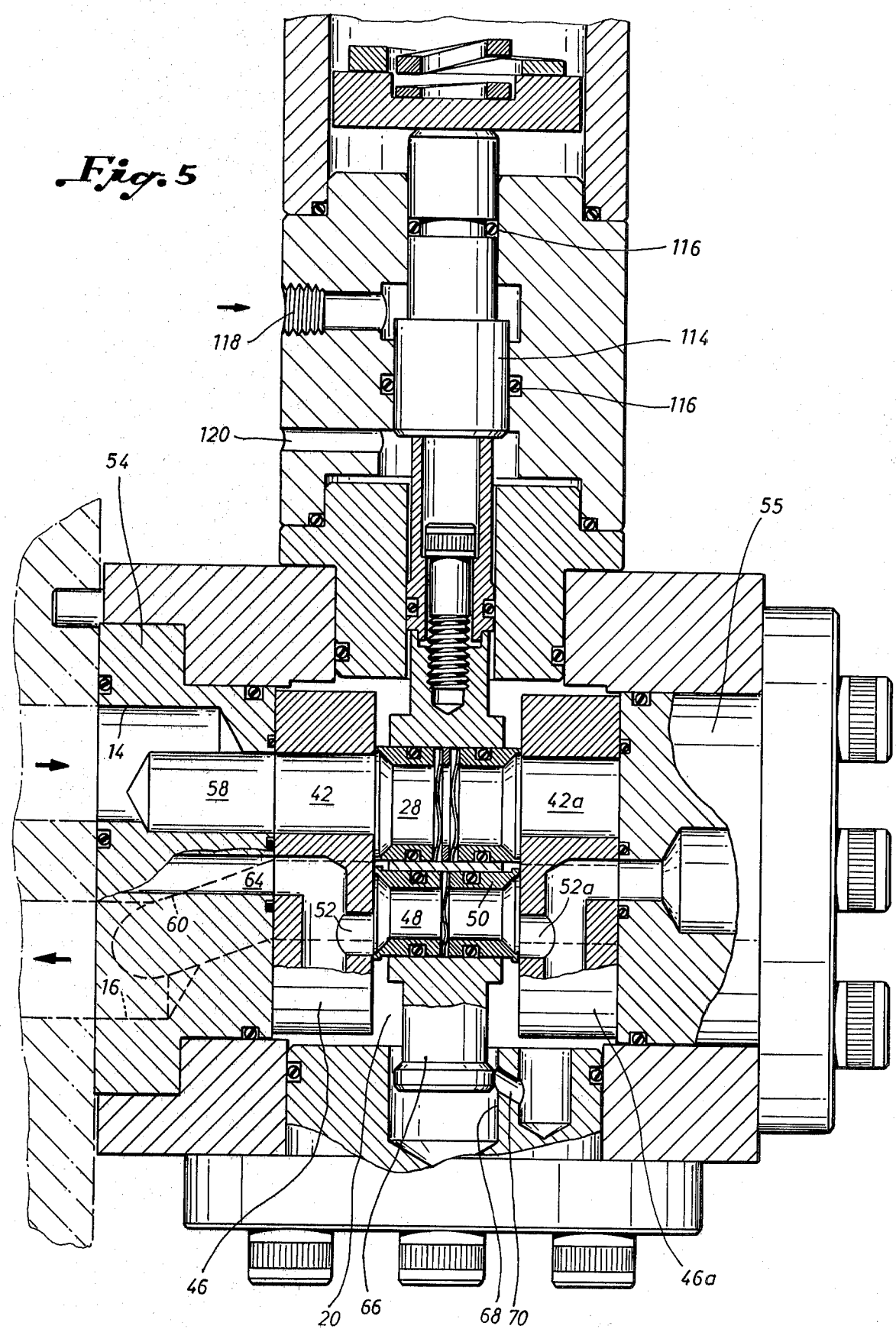

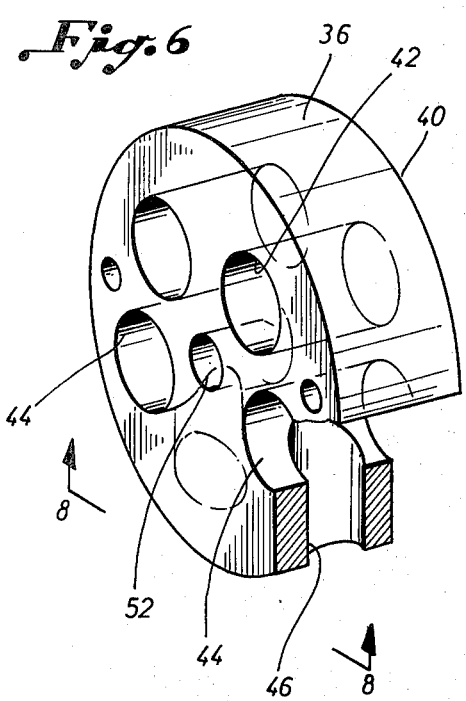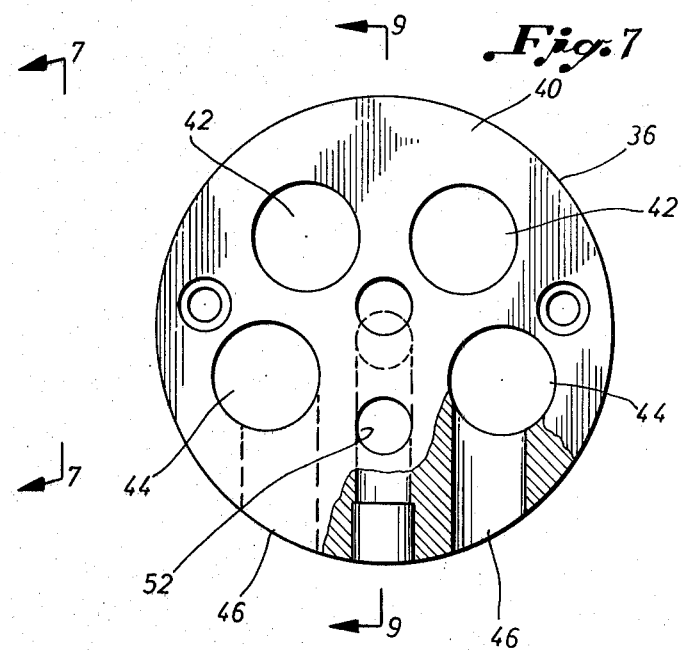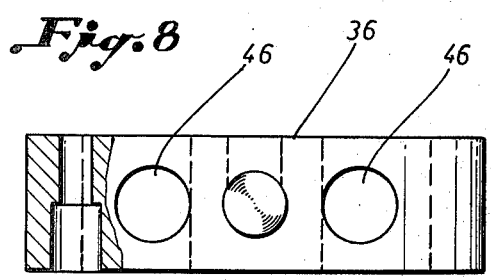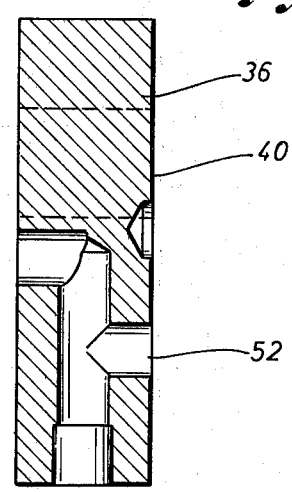

4,444,216

PRESSURE REDUCING AND REGULATING VALVE

BACKGROUND OF THE INVENTION

It is well known to provide a pressure reducing and regulating valve which is manually, pneumatically, or hydraulically operated to move a seal container between an inlet, an outlet, and vent ports in response to fluid pressure.

The present invention is directed to an improved pressure reducing and regulating valve in which multiple flow paths are provided which allows for maximizing the fluid flow through the valve with a shorter operating stroke. The present valve has a faster response time and is better stabilized. In addition, the present invention is directed to operating the valve by a power operated overdrive and/or manual actuation in which the adjusting or regulating screw is prevented from overrunning its limit of travel in each direction.

SUMMARY

The present invention is directed to a pressure reducing and regulating valve having a body with a body cavity, a plunger movable in the body, a piston connected to the plunger and exposed to pressure in the cavity and a seal container connected to the piston and movable in the body cavity. In order to maximize flow, provide a short actuation stroke and a faster response time, multiple flow paths are provided by having an opening in the container with a sliding seal in the opening. First and second flow plates are provided in the body positioned on opposite sides of the seal container and each flow plate includes an inlet port for communicating with the body cavity but are closed when the opening in the container are aligned with the inlet ports. Each of the flow plates includes an outlet port communicating with the body cavity and are communicable with the inlet port through the opening when the opening is moved to overlap both the inlet and outlet port. This provides flow paths from the inlet port to the outlet port through not only the opening, but around the seal container and through the body cavity.

Still a further object of the present invention is the provision for further increasing fluid flow and reducing the stroke by providing multiple openings and sliding seals in the seal container and multiple inlet and outlet ports in each flow plate.

Yet a still further object of the present invention is the provision for further maximizing fluid flow between inlet ports and the outlet ports by providing in each of the flow plates a passageway connected between each of the outlet ports and said body cavity.

Still a further object of the present invention is wherein the seal container has a third opening therethrough and a third sliding seal in the opening and each of the flow plates has a vent port in communication with the body cavity which are closed when the third opening in the container is aligned with the vent ports.

Still a further object of the invention is wherein the valve includes a porting plate having a first side connected to one of the flow plates in which the first side has a first and second inlet passageways connected respectively to first and second inlet ports in said one flow plate, and the first side has first and second outlet passageways connected, respectively, to first and second outlet ports of said one flow plate. The second side of the porting plate has a single inlet port connected to both the first and second inlet passageways and has a single outlet port connected to both of said first and second outlet passageways.

Still a further object of the present invention is the provision of a guide and dampener connected to the bottom of the seal container in which the body includes a dampening cavity for receiving the guide with a relief port extending from the cavity to the body cavity for increasingly dampening the movement of the container.

A still further object of the present invention is the provision of a power operated failsafe control in which spring means act against the plunger in a direction to increase the fluid flow through the valve, and an adjustable screw engages the spring means for adjusting the compression in the spring means, gear means engages the adjustable screw for rotating the screw, and motor means are connected to the gear means for adjusting the spring means. Preferably, the gear means is a worm gear.

Still a further object of the present invention is the provision of means for preventing the motor from driving the adjustable screw too far in either direction. The motor is a fluid motor having first and second fluid inlet ports for rotating the motor in first and second directions. A limiting valve having first and second fluid passageways is connected to the first and second ports, respectively, and to an exhaust port. The valve includes a spool element connected to the adjustable screw for alternately opening the first and second ports to exhaust as the screw moves to alternate extents of travel for limiting the extent of travel of the screw.

Other and further objects, features and advantages will be apparent from the following description of a presently preferred embodiment of the invention, given for the purpose of disclosure and taken in conjunction with the accompanying drawings.

BRIEF DESCRIPTION OF THE DRAWINGS

FIG. 3 is an enlarged fragmentary elevational view, partly in cross section, of the valve of the present invention shown in the vented position, FIG. 4 is a cross-sectional view taken along the line 4—4 of FIG. 3, FIG. 5 is an enlarged fragmentary elevational view, partly in cross section, showing the valve of the present invention in the fully closed position, FIG. 6 is an enlarged perspective view, partly broken away, of one of the flow plates in the valve, FIG. 7 is a view taken along the line 7—7 of FIG. 6, FIG. 8 is a view taken along the line 8—8 of FIG. 6, FIG. 9 is a cross-sectional view taken along the line 9—9 of FIG. 7.

DESCRIPTION OF THE PREFERRED EMBODIMENT

Figure 1:
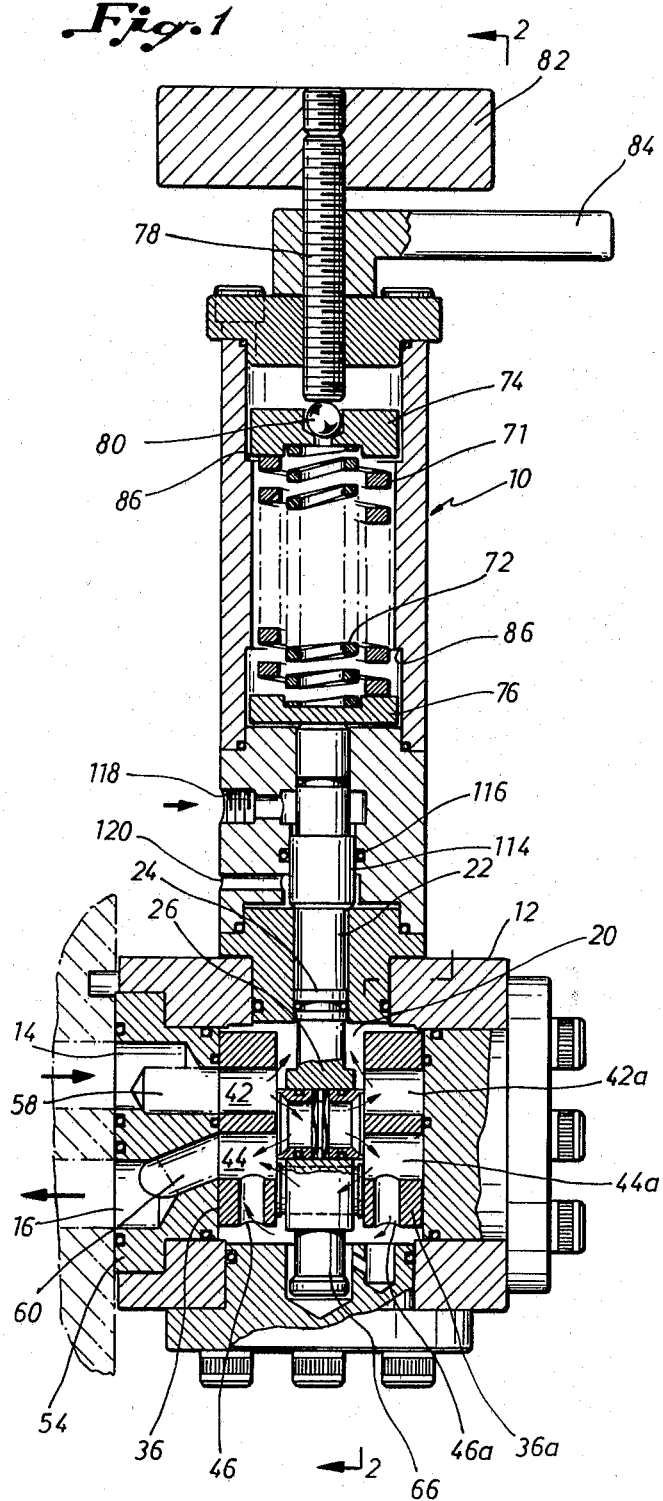
FIG. 1 is an elevational view, partly in cross section, of the valve of the present invention shown in the full open position.

Referring now to the drawings, and particularly to FIG. 1, the reference numeral 10 generally indicates the pressure reducing and regulating valve of the present invention which generally includes a body 12 having a fluid inlet 14, fluid outlet 16 and a vent 18. Generally, a hydraulic pressure supply source is connected to the inlet 14 and the hydraulic pressure is supplied at the outlet which is reduced and regulated. The body 12 has a body cavity 20, a plunger 22 movable in the body and a piston 24 connected to the plunger 22 and exposed to the pressure in the body cavity 20.

Figure 2:
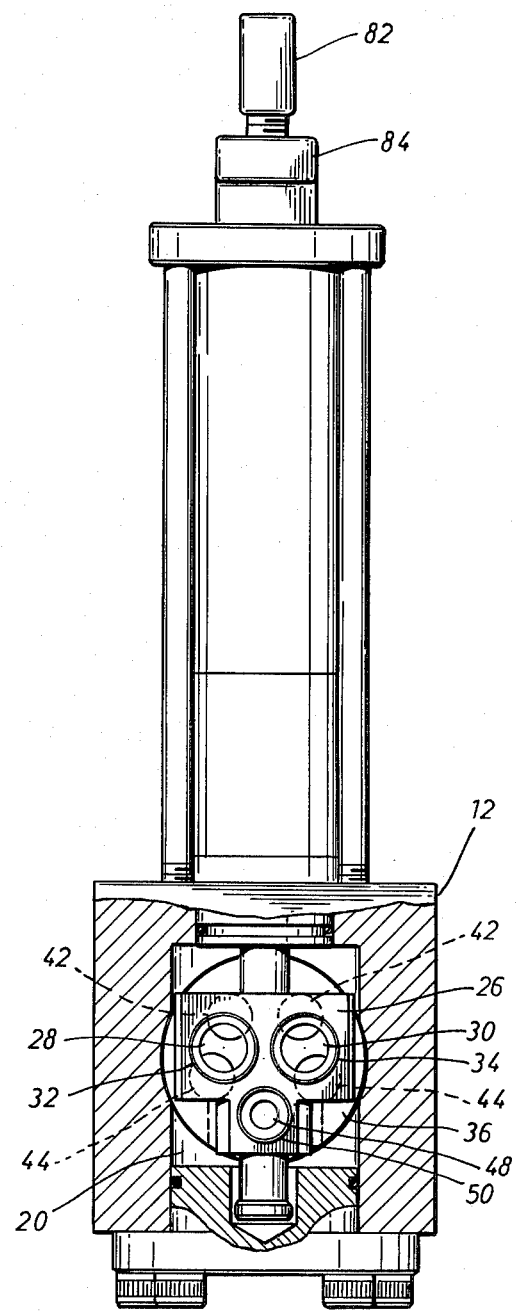
FIG. 2 is a cross-sectional view taken along the line 2—2 of FIG. 1.
Figure 10:
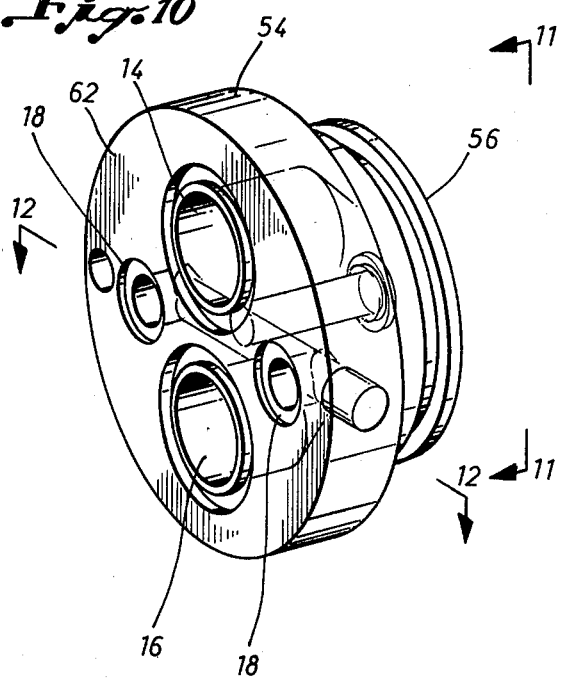
FIG. 10 is a perspective view of the porting plate of the present valve.
Figure 11:
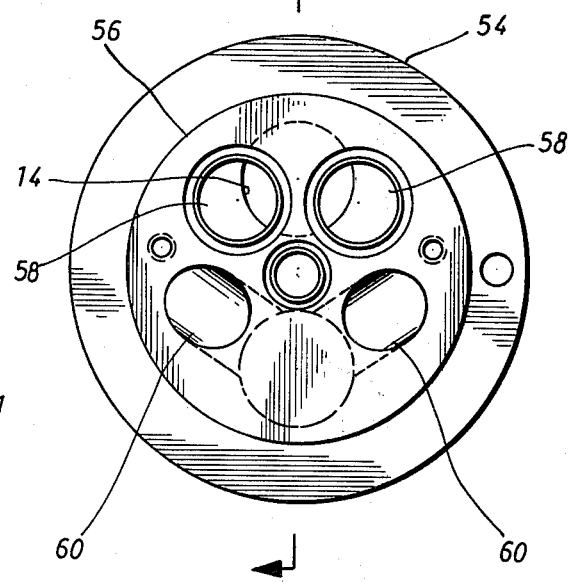
FIG. 11 is a view taken along the line 11—11 of FIG. 10.
Figure 12:
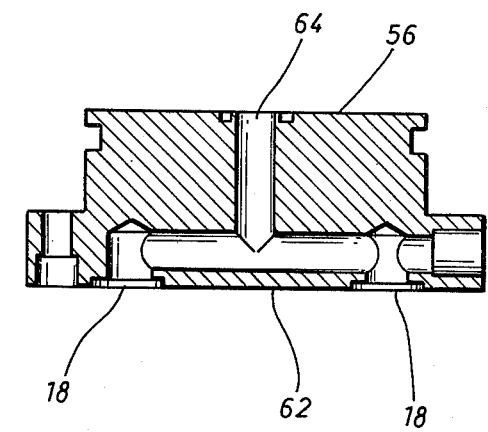
FIG. 12 is a cross-sectional view taken along the line 12—12 of FIG. 10.
Figure 13:
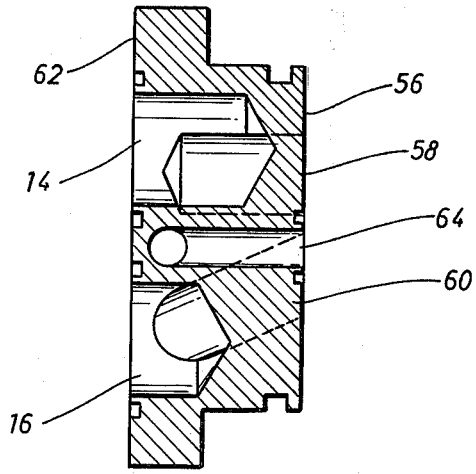
FIG. 13 is a cross-sectional view taken along the line 13—13 of FIG. 11.

Referring to FIG. 2, a seal container 26 is connected to the piston and movable in the body cavity 20. The seal container 26 includes one or more openings, such as first and second openings 28 and 30 which are preferably parallel to each other on opposite sides of the vertical axis of the container 26. First and second circular sliding seals 32 and 34 are positioned in the openings 28 and 30, respectively. The sliding seals 28 and 30 are conventional type hydra seat seals having two tubular members which are spring loaded outwardly to sealingly engage a first flow plate 36 and a second flow plate 36a which are positioned in the body 12 on opposite sides of the seal container 26.

The flow plates 36 and 36a are preferably identical, and are best seen in FIGS. 6–9 in which a single flow plate 36 is best seen. The flow plate 36 has a face 40 which engages the sliding seals 32 and 34 and includes one or more inlet ports such as first and second inlet ports 42 (plate 36a includes ports 42a) therethrough which communicate with the body cavity 20, but as best seen in FIGS. 3, 4 and 5, are closed when the first and second openings 28 and 30 of the seal container 26 are aligned with the inlet ports 42 and 42a and sealed off by the sliding seals 32 and 34.

Each of the flow plates 36 and 36a includes one or more outlet ports such as first and second outlet ports 44 and 44a, respectively, communicating with the body cavity 20 and also communicating with the first and second inlet ports 42 and 42a when the first and second openings 28 and 30 are moved to overlap both the inlet ports 42, 42a and the outlet ports 44, 44a as best seen in FIGS. 1 and 2. It is to be particularly noted that the present structure increases the flow paths between the inlet port 14 and the outlet port 16 as the incoming fluid flows not only from ports 42 through the openings 28 and 30 and into ports 42a and 44a and into the body cavity 20 for returning to the ports 44, but in addition flows out of the ports 42 directly into the body cavity 20 and around the seal container 26 for entering the ports 44. Another advantage of this structure is that this maximizing of flow from the inlet 14 to the outlet 16 may be made with a short stroke or smaller amount of travel of the seal container 26 than with conventional valves. This allows the valve 10 to have a faster response.

In order to further maximize the flow, each of the flow plates 36 and 36a includes a passageway 46 and 46a, respectively, connected between each of the first and second outlet ports 44 and 44a, respectively, and the body cavity 20 for further maximizing fluid flow between the inlet ports 42 and the outlet ports 44.

Referring now to FIGS. 3–9, the container 26 includes a third opening 48 therethrough and a third circular sliding seal 50 in the third opening 48. Each of the flow plates 36 and 36a includes a vent port 52 in communication with the body cavity 20 which is closed when the third opening 48 is aligned with the vent ports 52 and 52a, as best seen in FIG. 5. However, as best seen in FIGS. 3 and 4, the seal container 26 has moved upwardly and the sliding seal 50 has uncovered the vent ports 52 and 52a allowing venting of fluid pressure from the body cavity 20 through the vent port 52 directly from the body cavity 20 as well as through the third opening 48 from the vent port 52a.

Referring now to FIGS. 1, 3, 5 and 10–13, a porting plate 54 is provided having a first side 56 connected to one of the flow plates, such as flow plate 36. The first side 56 of the porting plate 54 has first and second inlet passageways 58 connected to the first and second inlet ports 42 of the flow plate 36. In addition, the first side 56 has first and second outlet passageways 60 connected respectively to the first and second outlet ports 44 of the flow plate 36. The second side 62 of the porting plate 54 has a single inlet port 14 which is connected to both of the first and second inlet passageways 58 and has a single outlet port 16 connected to both of the first and second outlet passageways 60. In addition, the porting plate 54 includes a vent passageway 64 in the face 56 connected to the vent port 52 in the flow plate 36. The second side 62 of the porting plate 54 includes vent outlets 18 connected to the vent passageway 64.

A port plate 55 is positioned adjacent the second flow plate 36a and may include a vent passageway 57 in communication with the vent port 52a although preferably passageway 57 is closed.

Referring now to FIGS. 1, 3 and 5, a guide and dampener 66 is connected to the bottom of the seal container 26 and is movable in a dampening cavity 68 for dampening rapid opening movements of the container 26. A relief port 70 is provided connected to the cavity 68 and extending to the body cavity 20 for providing increasing dampening of the movement of the container 26 as the valve 10 is opened.

Various types of operating mechanisms may be used to provide the desired pressures at which the valve 10 reduces and regulates the flow between the inlet 14 and the outlet 16. Referring now to FIG. 1, a manual operating mechanism is shown. Spring means such as one or more compression springs 71 and 72 may include an upper plate 74 and a lower plate 76 positioned at opposite ends of the spring means 71 and 72. The spring means 70 and 72 act in a direction against the plunger 22 to move the seal container 26 downwardly to increase the fluid flow through the valve 10. An adjustment screw 78 acts against a ball 80 in the upper plate 74 to adjust the compression in the spring 71 and 72 for adjusting the pressures at which the valve 10 operates. Adjustment screw 78 may be manually rotated by a handle 82 to vary the compression in the springs 71 and 72. A lock lever 84 is provided for locking the adjustment screw 78 to the body 12 after the desired adjustment is made. The above described manual actuation is generally conventional. However, in the valve 10 a stop 86 is provided on the body 12 for engaging the upper plate 74 for limiting the travel of the upper plate 74 in order to limit the maximum regulated pressured as desired, and to prevent blocking valve 10 open. In addition, a stop 88 is provided on the body 12 for limiting the upward movement of the lower plate 76 and thus of the seal carrier 26 to insure that the inlet ports 42 are not uncovered during a vent operation.

Figure 14:
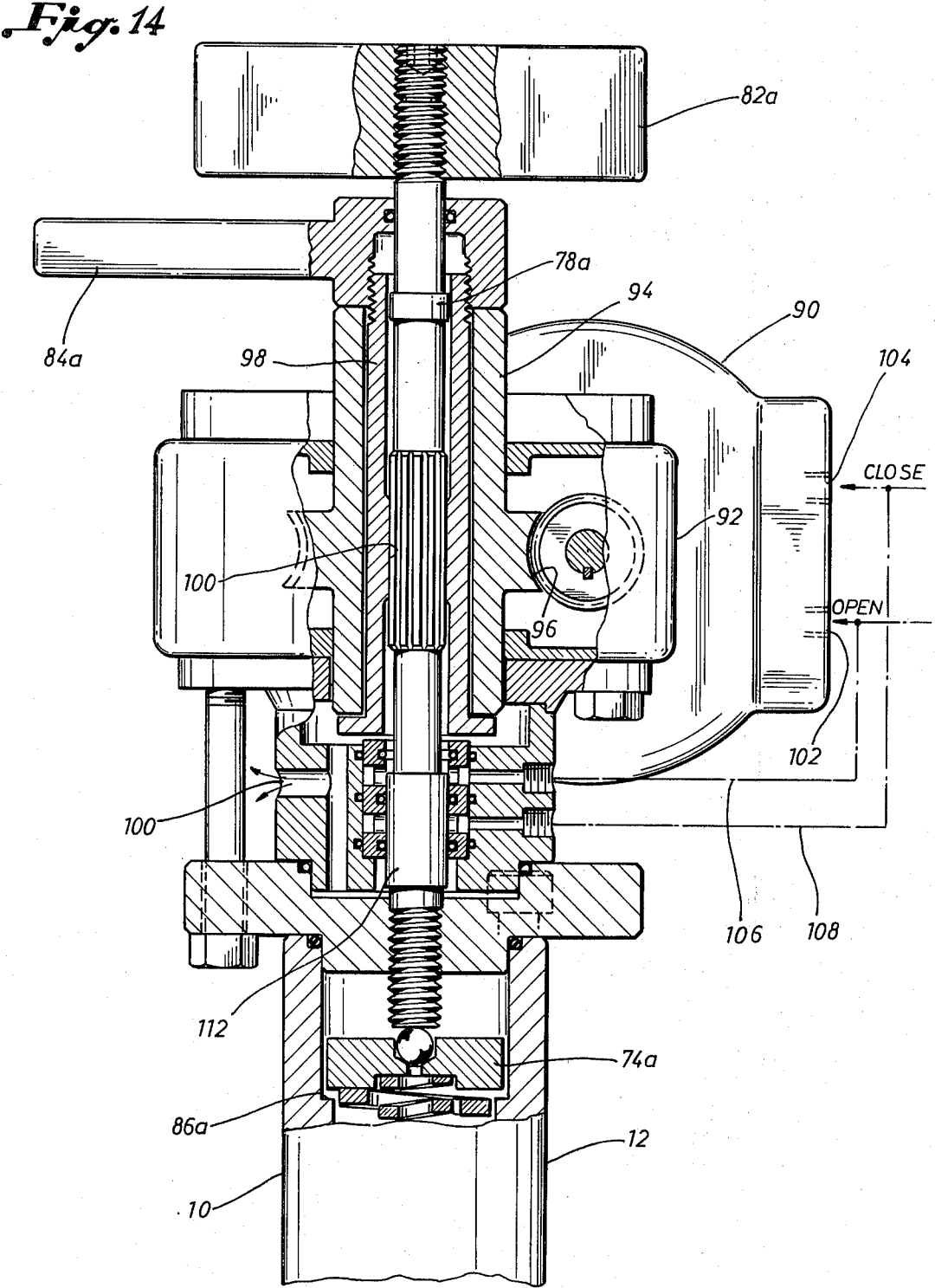
FIG. 14 is a fragmentary elevational view, in cross section, illustrating a combination of a manual control and power operated overdrive control for the valve of the present invention.

Referring now to FIG. 14, another form of the operating means for the valve 10 is illustrated which may be either manually operated, power operated or a combination. Again, a handle 82a may actuate an adjustable screw 78a to move an upper plate 74a to desirably adjust the compression in the springs. However, a motor 90 which may be either pneumatic, hydraulic, or electric and preferably pneumatic may be utilized to more quickly drive the adjustable screw 78a for more quickly adjusting the regulated pressure of the valve 10. By remote control the motor 90 drives a gear box 92 which in turn drives a mandrel 94 by a gear 96. The mandrel 94 may be locked to a sleeve 98 by means of the lever lock 84a. A spline connection 100 is provided between the sleeve 98 and the adjusting screw 78a. Therefore, when the lever 84a is locked and the motor 90 is actuated, the adjustable screw 78a is rotated to more quickly adjust the valve 10. Another advantage of the motor 90 and gear box 92 and 96 arrangement is that the power operation provides a failsafe device. That is, unlike a pneumatic diaphragm operator, if power to the motor 90 fails, the regulator 10 maintains the regulated pressure. Preferably, the gear connection 92 to 96 is a worm gear arrangement.

However, in utilizing a motor 90 power operation, it is important that the adjustable screw 78a be limited in the extent of its travel. That is, if the upper plate 74a is driven into the stop 86a, it will require a greater force to back off the screw 78a than is required to drive it on to the stop.

Therefore, another feature of the present invention is the provision of a safety override or valve means for limiting the extent of travel of the adjustable screw by the power means 90. The power means 90 includes a first port 102 and a second port 104 for receiving fluid pressure such as air for rotating the motor 90 in forward and reverse, respectively. That is, air flow into port 102 rotates the motor in a direction to open the valve 10 while when port 104 is receiving air the motor is moving the adjustable screw 78a in a direction to close the valve 10. Valve means are provided having first and second fluid passageways 106 and 108, respectively, connected to the ports 102 and 104. In addition, the passageways 106 and 108 are adapted to be connected to an exhaust port 110. A spool valve 112 connected to the adjustable screw 78a moves upwardly and downwardly for opening and closing the passageways 106 and 108 for exhausting the air pressure in the lines 106 or 108 and from ports 102 and 104 for limiting the extent of travel of the screw 78a by the motor 90. That is, assuming that air flows into port 102 and passageway 106 and actuates the motor to move the adjustable screw 78a downwardly, the spool 112 will move downwardly opening the passage 106 to exhaust 110 prior to the time that the upper plate 74a engages the stop shoulder 86a. Exhaust of fluid out the exhaust port 110 from the line 106 and port 102 will stop the rotation of the motor 90 and thus of the lead screw 78a. Similarly, when pressure is applied to the port 104 and passageway 108, the spool valve 112 will move upwardly and will open passageway 108 to exhaust the air from port 104 through the exhaust port 110 for limiting the extent of upward travel of the adjustable screw 78a.

Another feature of the present invention is the provision of an integral pilot operated bypass feature which allows the valve 10 to be operated by remote control, preferably hydraulically in order to quickly and easily move the valve to the full open position if operating conditions so require. Referring to FIGS. 1 and 5, a piston 114 is provided connected to the plunger 22 and is formed by seals 116 and exposed to fluid pressure through a control port 118. A vent line 120 is provided on the second side of the piston 114. Therefore, control pressure from any suitable valve, such as a pilot valve, may be transmitted through the port 118 against the piston 114 for quickly moving the valve 10 to the fully open position.

In operation, the valve is manually or power operated by the manual handle 82 or 82a or by the power motor 90 to set the valve 10 at the desired regulating pressure. A fluid supply source is connected to the inlet 14, and the compression springs 71 and 72 act in a direction on the plunger 22 to move the seal container 26 to the open position shown in FIG. 1. The pressure in the body cavity 20 acts against the piston 24 to attempt to move the seal container 26 upwardly to a closed position. So long as the seal container 26 is in the position shown in FIG. 1, incoming fluid through the inlet 14 will flow through the ports 42, through the openings 28 and 30 in the container 26 and through the various passageways in the body cavity 20 through the outlet ports 44 and the outlet 16 to supply regulated fluid pressure. When the fluid pressure at the outlet 16 and in the body cavity 20 increases sufficiently to the set pressure regulation, the force on the piston 24 will act against the compression springs 71 and 72 to move the seal container 26 to the closed position shown in FIG. 5. In this position, the openings 28 and 30 are aligned with the inlet ports 42 and 42a between the flow plates 36 and 36a to block further incoming fluid pressure from the body cavity 20. Also in this position it is noted that the third opening 48 is aligned with the vent ports 52 and 52a preventing the flow of fluid in the body cavity 20 to the vent ports 52 and 52a. If the pressure at the outlet 16 increases above the regulated pressure, the regulated pressure in the body cavity 20 will increase since the outlet ports 44 are in communication at all times with the body cavity 20 and the seal carrier 26 will move further upwardly to the vent position as best seen in FIG. 3. In this position, the inlet ports 42 and 42a are still closed by the seals 32 and 34, but the vent opening 48 has moved out of alignment with the vent passageways 52 and 52a allowing fluid pressure in the body cavity to flow to the vent outlets 18.

The present invention, therefore, is well adapted to carry out the objects and attain the ends and advantages mentioned as well as others inherent therein. While a presently preferred embodiment of the invention is given for the purpose of disclosure, numerous changes in the details of construction and arrangement of parts, will readily suggest themselves to those skilled in the art and which are encompassed within the spirit of the invention and the scope of the appended claims.

What is claimed is:

1. A pressure reducing and regulating valve comprising,
   a body having a body cavity,
   a plunger movable in the body,
   a piston connected to the plunger and exposed to pressure in the cavity,
   a seal container connected to the piston and movable in the body cavity,
   said container having an opening therethrough having a circular sliding seal in the opening,
   first and second flow plates in said body positioned on opposite sides of the seal container, each flow plate including an inlet port for communicating with the body cavity but closed when the opening in the container is aligned with said inlet ports, each flow plate including an outlet port communicating with the body cavity and communicable with the inlet port through the opening when the opening is moved to overlap both the inlet and outlet ports.

2. The apparatus of claim 1 including, each of said flow plates having a passageway connected between its outlet port and said body cavity for maximizing fluid flow between the inlet ports and the outlet ports.

3. A pressure reducing and regulating valve comprising, a body having a body cavity, a plunger movable in the body, a piston connected to the plunger and exposed to pressure in the cavity, a seal container connected to the piston and movable in the body cavity, said container having first and second openings therethrough having first and second circular sliding seals in said first and second openings, respectively, first and second flow plates in said body positioned on opposite sides of the seal container, each flow plate including first and second inlet ports for communicating with the body cavity but closed when the first and second openings in the container are aligned with said inlet ports, each flow plate including first and second outlet ports communicating with the body cavity and communicable with the first and second inlet ports, respectively, through the first and second openings, respectively, when the first and second openings are moved to overlap both the inlet and outlet ports.

4. The apparatus of claim 3 including, each said flow plates having a passageway connected between each of said first and second outlet ports and said body cavity for maximizing fluid flow between said inlet ports and said outlet ports.

5. The apparatus of claim 3 including, said container having a third opening therethrough and a third circular sliding seal in the third opening, each of said flow plates having a vent port in communication with the body cavity which are closed when the third opening in the container is aligned with the vent ports.

6. The apparatus of claim 3 including, a porting plate having a first side connected to one of the flow plates, said first side having first and second inlet passageways connected respectively to the first and second inlet ports of said one flow plate, and said first side having first and second outlet passageways connected respectively to the first and second outlet ports of said one flow plate, a second side of the porting plate having a single inlet port connected to both of said first and second inlet passageways and having a single outlet port connected to both of said first and second outlet passageways.

7. The apparatus of claim 3 including, a guide and dampener connected to the bottom of the container, said body including a dampening cavity for receiving said guide, and a relief port extending from said cavity to the body cavity for increasing dampening movement of the container.

8. The apparatus of claim 3 including, spring means acting against the plunger in a direction to increase the fluid flow through said valve, an adjustable screw engaging said spring means for adjusting the compression in said spring means, gear means engaging said adjustable screw for rotating said screw, and motor means connected to said gear means for adjusting said spring means.

9. The apparatus of claim 8 wherein said gear means is a worm gear.

10. The apparatus of claim 8 including, said motor means is a fluid means having first and second fluid inlet ports for rotating said motor means in first and second directions, valve means having first and second fluid passageways connected to said first and second ports respectively, said passageways being connectable to an exhaust port, said valve means including a spool element connected to said adjustable screw for alternately opening said first and second ports to exhaust as the screw moves to alternate extents of travel for limiting the extent of travel of said screw.

11. The apparatus of claim 8 including, manual actuating means connected to the adjustable screw for rotating said screw manually.

12. The apparatus of claim 8 including, an upper plate and a lower plate at opposite ends of said spring means, said body including stop means limiting the downward movement of the upper plate and stop means limiting the upper movement of the bottom plate.

13. A pressure reducing and regulating valve comprising, a body having a body cavity, a plunger movable in the body, a piston connected to the plunger and exposed to pressure in the cavity, a seal container connected to the piston and movable in the body cavity, said container having first and second parallel openings therethrough positioned on opposite sides of the axis of the container, and having first and second circular sliding seals in said first and second openings, respectively, first and second flow plates in said body positioned on opposite sides of the seal container, each flow plate including first and second inlet ports for communicating with the body cavity but closed when the first and second openings in the container are aligned with said inlet ports, each flow plate including first and second outlet ports communicating with the body cavity and communicable with the first and second inlet ports, respectively, through the first and second openings, respectively, when the first and second openings are moved to overlap both the inlet and outlet ports, each of said flow plates having a passageway laterally extending between each of said first and second outlet ports to said body cavity, said container having a third opening therethrough and a third circular sliding seal in the third opening, each of said flow plates having a vent port in communication with the body cavity which are closed when the third opening in the container is aligned with the vent ports.

14. In a pressure reducing and regulating valve having a body cavity, a plunger having a piston movable in the body and connected to a seal container having a plurality of openings having seals therein, and an inlet and outlet port connected to the body, the improvement in means for operating said container for controlling the flow of fluid in said valve comprising, spring means acting against the plunger in a direction to increase the fluid flow through said valve, an adjustable screw engaging said spring means for adjusting the compression in said spring means, gear means engaging said adjustable screw for rotating said screw, motor means connected to said gear means for adjusting said spring means, said motor means is a fluid means having first and second fluid inlet ports for rotating said motor means in first and second directions, valve means having first and second fluid passageways connected to said first and second ports, respectively, said passageways being connectable to an exhaust port, said valve means including a spool element connected to said adjustable screw for alternately opening said first and second ports to exhaust as the screw moves to alternate extents of travel for limiting the extent of travel of said screw.

15. The apparatus of claim 1 including, said container having a second opening therethrough and a circular sliding seal in the second opening, and each of said flow plates having a vent port in communication with the body cavity which are closed when the second opening in the container is aligned with the vent ports.

16. The apparatus of claim 15 including a porting plate connected to one of the flow plates, said porting plate including an inlet passageway and an outlet passageway and a vent passageway for connection to the inlet port, outlet port and vent port and said one flow plate, and a second plate connected to the second flow plate opposite the container and closing the inlet port, outlet port and vent ports of the second flow plate.

17. In a pressure reducing and regulating valve having a body cavity, a plunger having a piston movable in the body and connected to a seal container having a plurality of openings having seals therein, and an inlet and outlet port connected to the body, the improvement in means for operating said seal container for controlling the flow of fluid in said valve comprising, spring means acting against the plunger in a direction to increase the fluid flow through said valve, an adjustable screw engaging said spring means for adjusting the compression in said spring means, manual actuating means connected to the adjustable screw for rotating and adjusting said screw, a sleeve coaxially positioned relative to the screw, longitudinally extending spline means between the sleeve and the screw whereby rotation of the sleeve rotates, longitudinally moves and adjusts said screw and spring, gear means actuating said sleeve for rotating said screw, and motor means connected to said gear means for adjusting the screw and said spring means whereby the regulating valve will maintain the regulated pressure in the event of loss of power to the motor.

18. In a pressure reducing and regulating valve having a body cavity, a plunger having a piston movable in the body and connected to a seal container having a plurality of openings having seals therein, and an inlet and outlet port connected to the body, the improvement in means for operating said seal container for controlling the flow of fluid in said valve comprising, spring means acting against the plunger in a direction to increase the fluid flow through said valve, an adjustable screw threadedly engaging said body and engaging said spring means for adjusting the compression in said spring means, manual actuating means connected to the screw for rotating said screw relative to the body thereby adjusting the compression in said spring means, a rotatable sleeve telescopically positioned about the screw, longitudinally extending spline means between the sleeve and the screw whereby rotation of the sleeve rotates the screw and adjusts the compression in the spring, a hollow rotatable mandrel positioned about the sleeve, locking means for locking said mandrel and sleeve together, gear means connected to said mandrel for rotating said mandrel, and motor means connected to said gear means for rotating said mandrel, sleeve, adjusting screw thereby adjusting the compression in the spring means whereby the regulating valve will maintain the regulated pressure in the event of loss of power to the motor and also allows manual adjustment of the valve.

19. The apparatus of claim 18 wherein the gear means is a worm gear.

* * * * *